(12) United States Patent
Wong et al.

(10) Patent No.: US 7,579,829 B1
(45) Date of Patent: Aug. 25, 2009

(54) INDUCTIVE MULTI-TURN ENCODER

(75) Inventors: Weng Fei Wong, Gelugor (MY); Sze Kuang Lee, Bayan Lepas (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/168,151

(22) Filed: Jul. 6, 2008

(51) Int. Cl.
*G01B 7/30* (2006.01)
*G01B 7/14* (2006.01)

(52) U.S. Cl. .......................... 324/207.25; 324/207.15

(58) Field of Classification Search ......... 324/173–174, 324/207.15–207.17, 207.25, 256–258, 239, 324/243; 73/514.31, 514.39; 702/151
See application file for complete search history.

(56) References Cited

U.S. PATENT DOCUMENTS

| | | | |
|---|---|---|---|
| 6,611,138 B2 | 8/2003 | Vasiloiu | |
| 6,683,545 B2 | 1/2004 | Strasser | |
| 6,738,725 B2 * | 5/2004 | Koga et al. ................. | 702/151 |
| 7,098,654 B2 | 8/2006 | Mehnert et al. | |
| 7,382,121 B2 * | 6/2008 | Shiraga et al. ......... | 324/207.25 |
| 7,465,918 B2 * | 12/2008 | Shimizu et al. ........ | 250/231.15 |

OTHER PUBLICATIONS

Angle Measuring Systems in accordance witht eh AMOSIN-Measuring Principle; AMO Automatisierung Messtechnik Optik GmbH; Date unknown.
No gearrbox—no battery; The new generation of robust multiturn absolute encoders; Wilhelmy, Lothar; PROFI Process Field Bus ssi; CANopen; Encoders and Sensors, antrieibstechnik, Jan. 2008.
Agilent AEAT-84AD 14/12 Bit Multi-turn Encoder Module Data Sheet; Dec. 2004, Agilent Technologies, Inc.

* cited by examiner

*Primary Examiner*—Bot L LeDynh

(57) ABSTRACT

According to one embodiment, there is provided an inductive multi-turn encoder which employs inductive means to determine the number of revolutions a central shaft operably connected to the module has turned. The inductive coils comprise emitter coils and receiver coils, which are operably associated with and opposed to corresponding geared circular disks, which in turn are arranged to implement a predetermined gear reduction ratio. The inductive multi-turn encoder is capable of operating under high temperature conditions and withstanding the effects of various environmental contaminants. The inductive multi-turn encoder disclosed herein is also amenable to miniaturization and low cost manufacturing.

28 Claims, 6 Drawing Sheets

INDUCTIVE MULTI-TURN ENCODER

FIELD OF THE INVENTION

Various embodiments of the invention described herein relate to the field of encoders, and components, devices, systems and methods associated therewith.

BACKGROUND

Multi-turn optical encoders are employed in many different applications. The mechanical construction of multi-turn optical encoders is normally based on gear train design, where gears with openings or holes must be provided for light to pass through the gears for subsequent collimation, reflection or detection. The openings or holes often prevent the gears in optical encoders from being packed very close to one another, and also reduce the precision that may be obtained for injection-molded gears. In addition, substrates such as printed circuit boards, flexible cables and the like are typically required on both sides of the gear train to impart the required mechanical integrity to such optical encoders. Finally, multi-turn optical encoders are typically incapable of sensing partial revolutions of the constituent disks contained therein.

Magnetic multi-turn encoders are also known in the art, but are easily affected by external magnetic fields and cannot operate at very high temperatures without being demagnetized. Such characteristics obviously limit the type and number of applications in which magnetic multi-turn encoders may be used.

What is needed is a multi-turn encoder that may be made more compact, manufactured at lower cost, operate at higher precision, and permit partial revolutions of constituent disks to be sensed and measured.

SUMMARY

In some embodiments, there is provided a multi-turn encoder module comprising a rotatable shaft having gears disposed about a periphery thereof, a baseplate having an aperture disposed therethrough and configured to accept at least a portion of the shaft therein, the baseplate further comprising a plurality of geared circular disks mounted therein or thereon, at least some of the geared circular disks having an electrically conductive portion formed thereon or thereon, a substrate having a plurality of inductive coils disposed thereon, each of the inductive coils being operably aligned and configured in respect of at least one corresponding opposing geared circular disk and the electrically conductive portion thereof, and a position logic device configured to determine a rotational parameter of the shaft on the basis of the relative positions of the geared circular disks respecting one another as they are sensed by the inductive coils, where the substrate opposes the baseplate, the shaft is operably and mechanically connected to at least one of the geared circular disks by the shaft gears, rotation of the shaft causes the at least one geared circular disks to rotate and thereby cause the remaining geared circular disks to rotate according to a predetermined gear reduction ratio, and each of the inductive coils is configured to generate an output signal representative of a revolution of the geared circular disk operably aligned in respect thereof and opposed thereto, thereby to permit a number of revolutions the shaft has rotated to be determined by the position logic device.

In another embodiment, there is provided a method of determining a number of revolutions a shaft in a multi-turn encoder has turned comprising providing a rotatable-shaft having gears disposed about a periphery thereof, providing a baseplate having an aperture disposed therethrough and configured to accept at least a portion of the shaft therein, the baseplate further comprising a plurality of geared circular disks mounted therein or thereon, at least some of the geared circular disks having an electrically conductive portion formed thereon or thereon, the shaft being operably and mechanically connected to at least one of the geared circular disks by the gears thereof, providing a substrate having a plurality of inductive coils disposed thereon, each of the inductive coils being operably aligned and configured in respect of a corresponding opposing geared circular disk and the electrically conductive portion thereof, the substrate opposing the baseplate, providing position logic configured to determine a rotational parameter of the shaft on the basis of the relative positions of the geared circular disks respecting one another as they are sensed by the inductive coils, rotating the shaft and thereby causing the geared circular disks to rotate according to a predetermined gear reduction ratio, and for each inductive coil, generating an output signal representative of a revolution of the geared circular disk corresponding thereto, operably aligned in respect thereof and opposed thereto, thereby to permit a number of revolutions the shaft has rotated to be determined by the position logic device.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

Figure 1A:
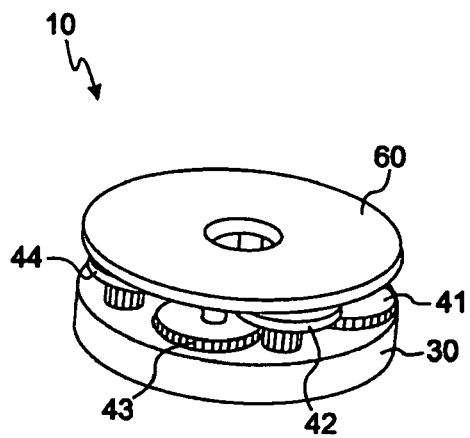
FIG. 1(a) shows a perspective view of one embodiment of an inductive multi-turn encoder of the invention.

Referring to FIGS. 1(a) through 4, there is shown one embodiment of multi-turn encoder module 10 comprising rotatable shaft or pinion 20 having gears 22 disposed about a periphery thereof. Baseplate 30 has an aperture 32 disposed therethrough, and is configured to accept at least a portion of shaft 20 therein. Baseplate 30 further comprises a plurality of geared circular disks 41 through 46 mounted therein or thereon, where at least some of the geared circular disks have an electrically conductive portion formed thereon or therein. For example, disks 42, 44 and 46 have, respectively, electrically conductive portions 42', 44' and 46' disposed therein or therein. Note that for the sake of simplicity and not obscuring the more salient features of the drawings, geared circular disks 41 through 46 in FIGS. 1(a) and 1(b) are shown without gears disposed about the outer peripheries thereof.

As shown, substrate 60 has a plurality of sets of inductive coils 62a through 66g disposed thereon or therein, where each of the inductive coils is operably aligned and configured in respect of a corresponding opposing geared circular disk and the electrically conductive portion thereof. A position logic device (not shown) is configured to determine a rotational parameter of shaft 20 on the basis of the relative positions of geared circular disks 42, 44 and 46 respecting one another as they are sensed by inductive coils 62a through 66g.

Further as shown in FIGS. 1(a) through 4, substrate 60 opposes baseplate 30, and shaft 20 is operably and mechanically connected to geared circular disk 41 by shaft gears 22. Rotation of shaft 20 causes geared circular disk 41 to rotate and thereby cause remaining geared circular disks 42 through 46 to rotate according to a predetermined gear reduction ratio. Each of inductive coils 62a through 66g is configured to generate an output signal representative of a revolution of the corresponding geared circular disk operably aligned in respect thereof and opposed thereto, which permits a number of revolutions shaft 20 has rotated to be determined by the position logic device, which may be any suitable processing or logic device, such as a controller, ASIC, processor, microprocessor, micro-controller, CPU, or any combination of appropriate logic hardware and/or software.

Depending on the particular application at hand, multi-turn encoder module 10 may be configured to provide any of a number of different gear reduction ratios in respect of rotation of shaft 20 and the rotation of the last geared circular disk caused to be rotated by the action of shaft 20 rotating, including, but not limited to gear reduction ratios of 4,096, 2,048, 1,024, 512 and 256. Note that gear reduction ratios other than those explicitly disclosed herein are also contemplated in the present invention. Implementation of a selected gear reduction ratio requires selecting an appropriate number of geared circular disks to employ, selecting the relative diameters and numbers of geared teeth of such disks respecting one another, and other factors well known to those skilled in the art of gear reduction. For example, multi-turn encoder module 10 may comprise three geared circular disks, where each disk imparts 4 bits of resolution to encoder module 10. In other examples, multi-turn encoder module 10 may comprise one geared disk, two geared disks, four geared disks, five geared disks, seven geared disks, or any other suitable number of gears, where the number of gears selected will depend on the particular application at hand, the gear reduction ratio that is desired, and other considerations and factors known to those skilled in the art.

Figure 1B:
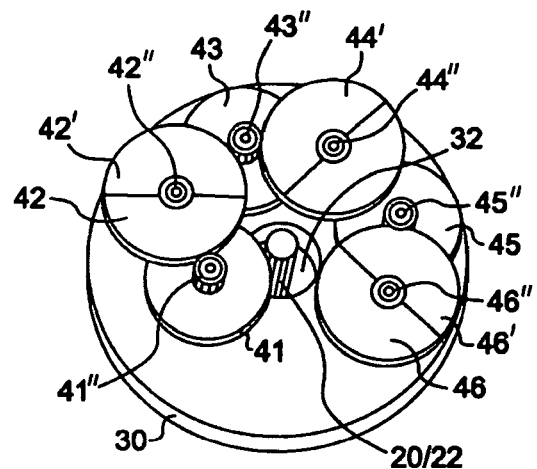
FIG. 1(b) shows a top perspective view of a baseplate and corresponding geared circular disks mounted thereon corresponding to the inductive multi-turn encoder of FIG. 1.
Figure 2A:
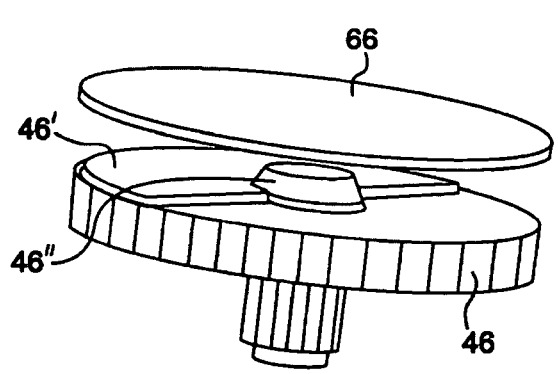
FIG. 2(a) shows a side perspective view of one geared circular disk and its corresponding inductive coil corresponding to the inductive multi-turn encoder of FIG. 1.
Figure 2B:
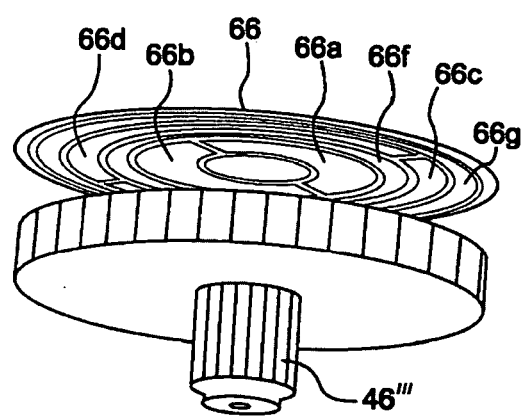
FIG. 2(b) shows a bottom perspective view of the geared circular disk and inductive coil of FIG. 2(a)
Figure 3:
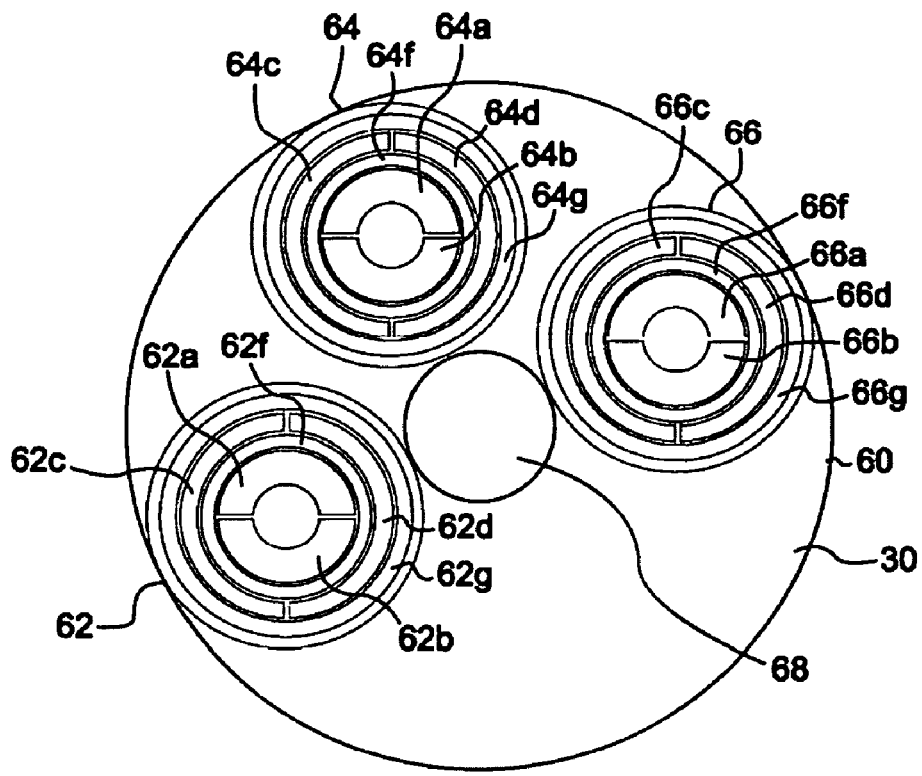
FIG. 3 shows a bottom plan view of the inductive coil substrate of FIG. 1(a)
Figure 4:
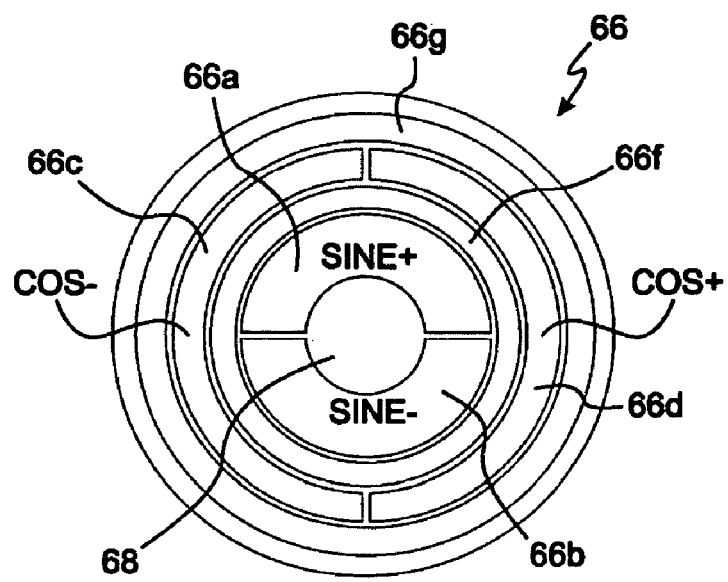
FIG. 4 shows details of one inductive coil of the substrate shown in FIG. 3.

As a further example of gear reduction, and referring to FIGS. 1(a), 1(b) and 3, there are shown six geared circular disks 41, 42, 43, 44, 45 and 46. In the illustrated embodiment, central geared shaft 20 is a pinion which meshes with and is configured to cause rotation of disk 41 when shaft 20 rotates. The gear ratio between shaft 20 and disk 41 is 1:4. Thus, when disk 41 completes 1 revolution, shaft 20 has rotated 4 revolutions ($2^2$, or 2 bits). The gear ratio between disk 41 and disk 42 is also 1:4. Thus, when disk 42 complete 1 revolution, disk 41 has completed 4 revolutions (also $2^2$, or 2 bits), while at the same time shaft 20 has rotated 16 revolutions ($2^4$, or 4 bits), and so on. Because multi-turn encoder module 10 shown in FIGS. 1(a), 1(b) and 3 comprises 6 different geared circular disks, each of which has a 1:4 gear ratio, module 10 is a 12-bit system capable of sensing 4,096 revolutions of shaft 20 with each complete revolution of the final geared circular disk in the system, disk 46. (As discussed above, other gear ratios and numbers of geared disks may also be employed and nevertheless fall within the scope of the present invention.)

Electrically conductive portions 42', 44' and 46' of geared circular disks 42, 44 and 465, respectively, may comprise at least one of metal, metal foil, an electrically conductive polymer, an electrically conductive plastic, a metal alloy, a combination of metals, or any other suitable electrically conductive material. As those skilled in the art will understand, however, for most applications metal is a preferred material.

Inductive coils 62a through 66g may be integrated into substrates 62, 64, and 66, or positioned or disposed thereatop or therebelow. Inductive coils 62a through 66g may further form separate components, which are attached to their respective substrates. Moreover, and as shown in FIGS. 2(b), 3, 4, and 5, inductive coils 62a through 66g comprise emitter or transmitter coils, and receiver coils. For example, and as further illustrated in FIGS. 2(b), 3, 4 and 5, each of inductive coils 62, 64 and 66 comprises one pair of emitter coils (i.e., coils 62f and 62g, and 64f and 64g, and 66f and 669) and two pairs of receiver coils (i.e., coils 62a/62b and 62c/62d, 64a/64b and 64c/64d, and 66a/66b and 66c/66d). By way of example, receiver coils 62a and 62b are 90 degrees out of phase with respect to one another. Other phase differences between received signals may also be employed, including, but not limited to, 30 degrees, 45 degrees, and 60 degrees.

As shown in FIGS. 1(a), 1(b) and 3, each of inductive coils 62, 64 and 66 is operably located above and aligned in respect of its corresponding geared circular disk 42, 44 and 46. The electrically conductive portions 42', 44' and 46' of geared circular disks 42, 44, and 46 are responsive to signals transmitted by inductive coil emitters 42f and 42g, 44f and 44g, and 46f and 46g, which in turn essentially reflect such transmitted signals back to differentially paired receiver coils 42a/42b and 42c/42d, 44a/44b and 44c/44d, and 46a/46b and 46c/46d, respectively, as disks 42, 44 and 46 rotate. That is, the rotation of each of geared circular disks 42, 44 and 46 causes the electrically conductive portion thereof to be sensed by the receiver coils corresponding thereto. Each pair of receiver coils outputs one cycle of SIN & COS signals for each complete revolution of the geared circular disk in question. The position logic device or processor then interpolates such signals into a 4 bit count.

Note that phase differences between receiver coils other than 90 degrees (e.g., SIN and COS) are contemplated in the present invention, and that such phase differences can assume any suitable value. Note further that counts other than those represented by 4 bits are also contemplated in the present invention, and may be any suitable number of bits. In addition, it is contemplated in the present invention that inductive coils 62, 64 and 66 be mounted not only on substrate 60, but alternatively on baseplate 30, in which case all six functional gears 41, 42, 43, 44, 45 and 46 would be equipped with inductive coils.

The inductive coils employed in multi-turn encoder 10 described herein are different from those typically employed in single-turn encoders. For example, the multi-turn inductive coils disclosed herein comprise discrete and separate emitter and receiver sectors, while single-turn inductive coils of the prior art are generally rectangular in shape. The multi-turn inductive coils disclosed herein comprise a set of receiver coils capable of "seeing" an entire revolution of a geared circular disk, while single-turn inductive coils of the prior art contain redundant coils capable of "seeing" only a portion of the revolution of a disk. While the multi-turn inductive coils disclosed herein provide only one sinusoidal signal for each revolution of a disk, single-turn inductive coils of the prior art generally yield several sinusoidal signal for each revolution of a disk.

Figure 5:
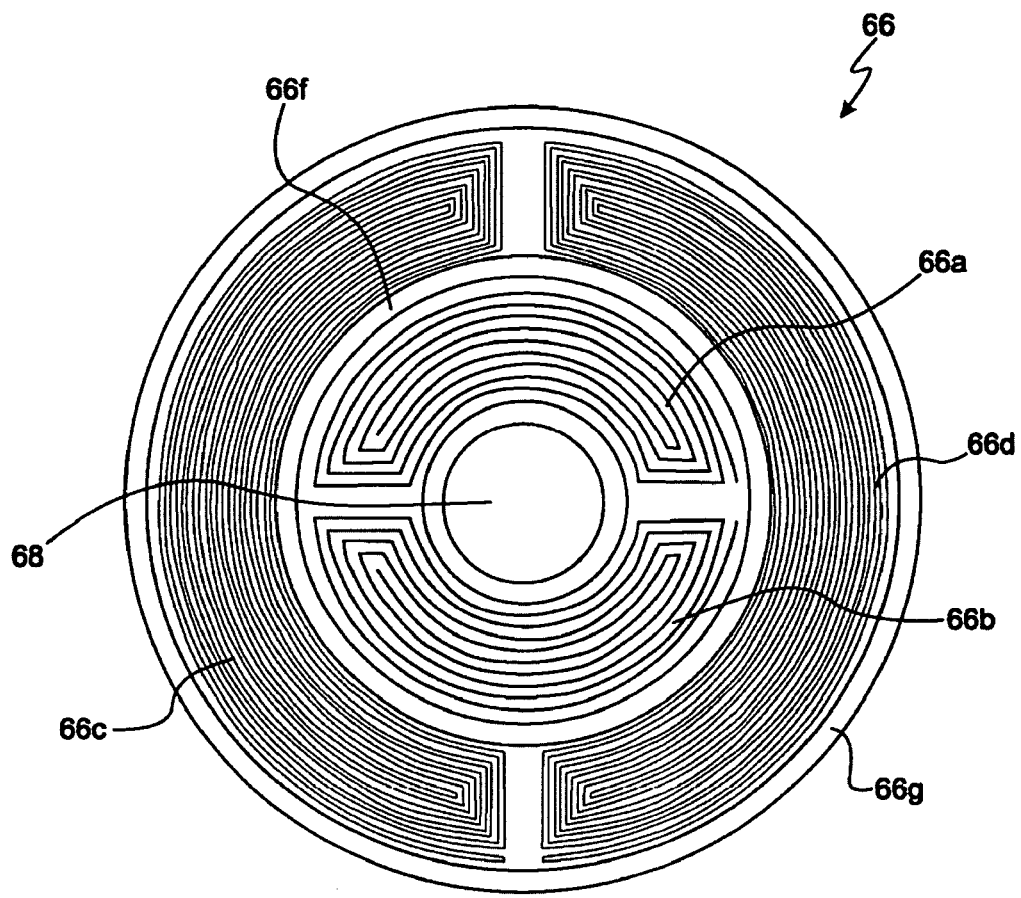
FIG. 5 shows another embodiment of an inductive coil of the invention.
Figure 6:
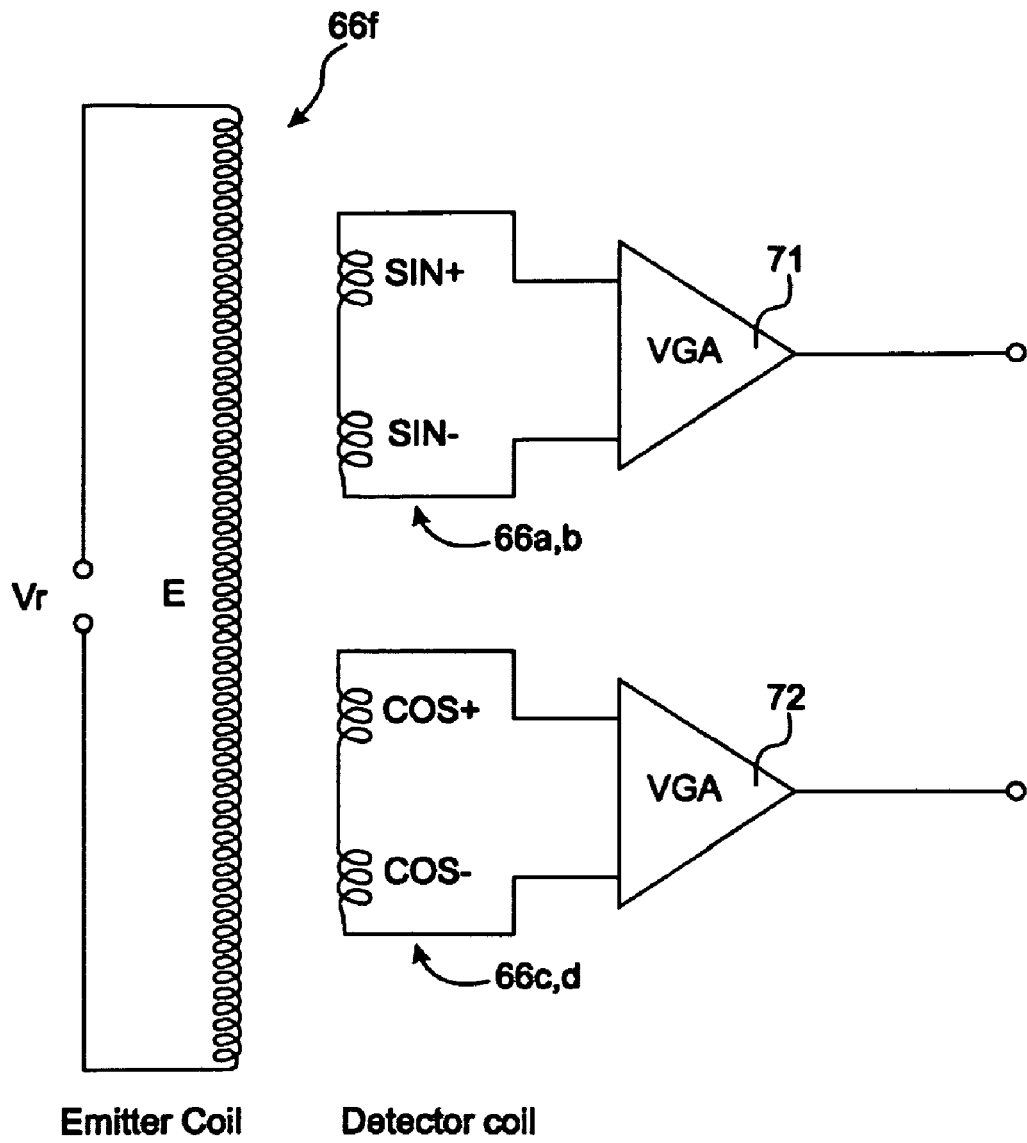
FIG. 6 shows a schematic electrical diagram of one embodiment of a coil emitter and a coil receiver of the invention.

FIG. 5 shows one embodiment of an inductive coil 66, which has emitter and receiver coils 66a through 66g configured as interleaved electrically conductive traces disposed on an underlying surface, which in turn is attached to or forms a portion of substrate 60. FIG. 6 shows a representative schematic electrical diagram of one inductive coil comprising an emitter coil 66f and two pairs of receiver coils 66a,b and 66c,d, which are each operably connected to a corresponding variable gain amplifier 71 or 72, which are each configured to receive and amplify the output signals provided thereto by the emitter coils.

Figure 7:
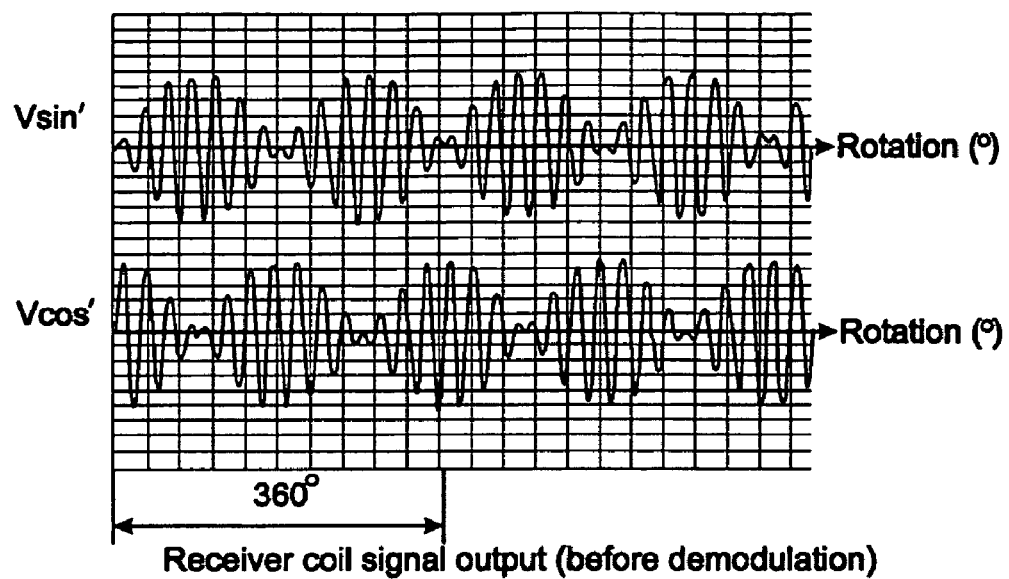
FIGS. 7 and 8 shows representative modulated and demodulated outputs provided according to one embodiment of the inductive coils of the invention.
Figure 8:
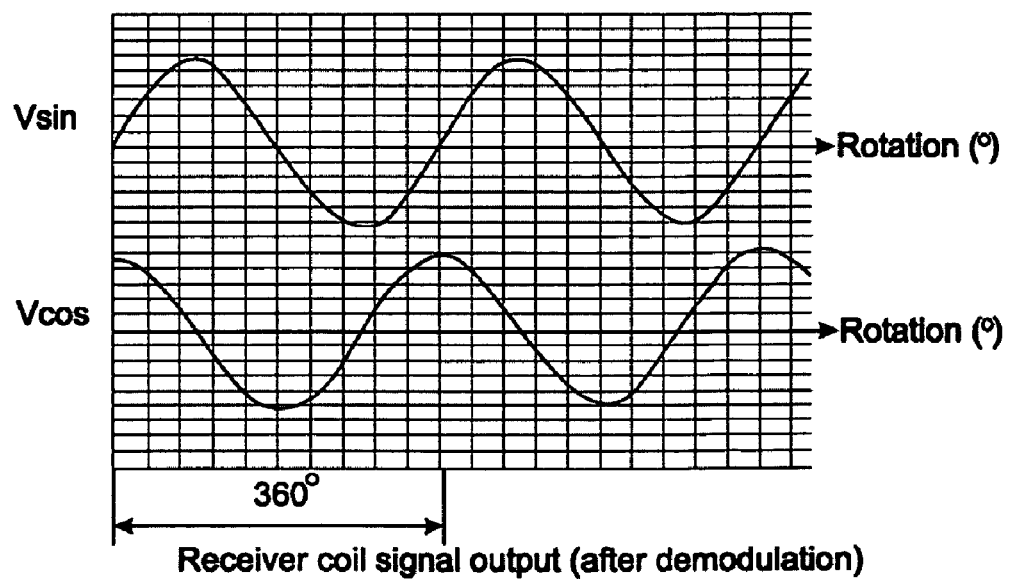
Figure 9:
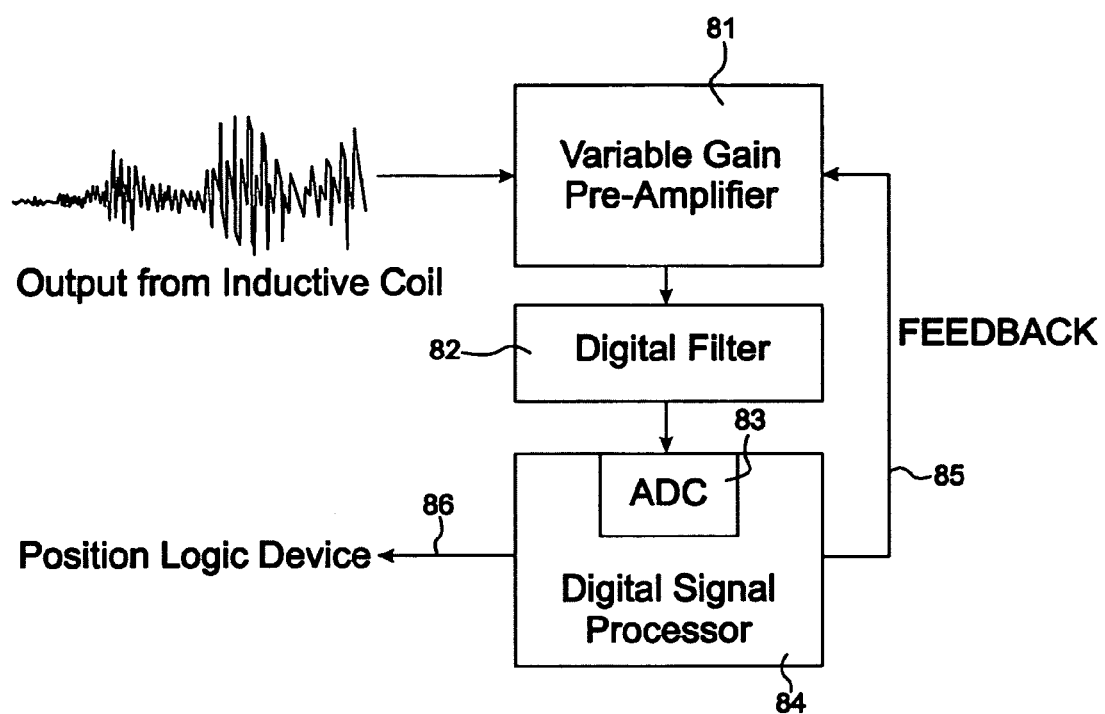
FIG. 9 shows one embodiment of a block diagram of an inductive multi-turn encoder of the invention.

Representative waveforms provided as outputs by receiver coils 90 degrees out of phase with respect to one another are shown in FIG. 7 (before demodulation) and FIG. 8 (after demodulation). A carrier frequency signal included in the output signals provided by the emitter coils may be removed by a suitable digital filtering circuit, as is known in the art. As further illustrated in FIG. 9, an analog-to-digital converter configured to convert the output signals provided by the emitter coils into a digital format may also be employed as part of the position logic device to provide a digital output signal representative of a shaft position and/or the number of revolutions the shaft has rotated.

As will now become apparent, the multi-turn inductive encoder disclosed herein has numerous advantages, including the ability to design an encoder which has inductive sensors placed on a single side of the module, and providing an encoder which permits the rotational position of a disk to be monitored an measured throughout its entire revolution without using an excessive number of coils, tracks or traces. These features, in turn, permit a multi-turn encoder to be provided which has increased flexibility respecting gear placement and design in comparison to optical encoders.

Another advantage of the multi-turn inductive encoder described and disclosed herein is the ability to place inductive coils on a single side of a gear or gear train, which may be especially advantageous when a multi-turn encoder with inductive coils assembled on a substrate with electronics on board is sold as module. Various embodiments of the multi-turn inductive encoder of the invention may also be configured to generate direct raw output signals conforming to virtually any desired format such as Gray code, binary and so on, which optical multi-turn encoders are incapable of providing. The multi-turn inductive encoders of the invention are also capable of withstanding very high operating temperatures and are especially resistant to dust, liquid and other environmental contaminants.

The inductive multi-turn encoder of the invention may also be fabricated directly on a flexible circuit, a printed circuit board, a ceramic substrate, or any other suitable substrate material.

Note that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:
1. A multi-turn encoder module, comprising:
a rotatable shaft having gears disposed about a periphery thereof;
a baseplate having an aperture disposed therethrough and configured to accept at least a portion of the shaft therein, the baseplate further comprising a plurality of geared circular disks, at least some of the geared circular disks comprising an electrically conductive portion;
a substrate having a plurality of inductive coils, each of the inductive coils being operably aligned and configured in respect of at least one corresponding opposing geared circular disk and the electrically conductive portion thereof, and
a position logic device configured to determine a rotational parameter of the shaft on the basis of the relative positions of the geared circular disks respecting one another as they are sensed by the inductive coils;
wherein the substrate opposes the baseplate, the shaft is operably and mechanically connected to at least one of the geared circular disks by the shaft gears, rotation of the shaft causes the at least one geared circular disks to rotate and thereby cause the remaining geared circular disks to rotate according to a predetermined gear reduction ratio, and each of the inductive coils is configured to generate an output signal representative of a revolution of the geared circular disk operably aligned in respect thereof and opposed thereto, thereby to permit a number of revolutions the shaft has rotated to be determined by the position logic device.

2. The multi-turn encoder module of claim 1, wherein the gear reduction ratio in respect of rotation of the shaft and rotation of the last geared circular disk caused to be rotated by rotation of the shaft is one of 4,096, 2,048, 1024 and 512.

3. The multi-turn encoder module of claim 1, wherein the module comprises three geared circular disks, each disk imparting 4 bits of resolution to the encoder module.

4. The multi-turn encoder module of claim 1, wherein the electrically conductive portions of the geared circular disks comprise at least one of metal, metal foil, an electrically conductive polymer, an electrically conductive plastic, a metal alloy, and a combination of metals.

5. The multi-turn encoder module of claim 1, wherein each of the plurality of inductive coils is integrated into the substrate.

6. The multi-turn encoder module of claim 1, wherein each of the plurality of inductive coils forms a separate component attached to the substrate.

7. The multi-turn encoder module of claim 1, wherein each of the plurality of inductive coils comprises at least one emitter coil and at least one receiver coil.

8. The multi-turn encoder module of claim 7, wherein the at least one receiver coil comprises at least one pair of receiver coils.

9. The multi-turn encoder module of claim 8, wherein the receiver coils are arranged 90 degrees out of phase with respect to one another.

10. The multi-turn encoder module of claim 1, further comprising a variable gain pre-amplifier configured to receive and amplify the output signals.

11. The multi-turn encoder module of claim 10, further comprising a digital filtering circuit configured to remove a carrier frequency of the output signals.

12. The multi-turn encoder module of claim 10, further comprising an analog-to-digital converter configured to convert the output signals from an analog form to a digital representation thereof.

13. The multi-turn encoder module of claim 10, further comprising a digital signal processor configured to provide a digital output signal representative of a shaft position.

14. The multi-turn encoder module of claim 10, further comprising a digital signal processor configured to provide a digital output signal representative of the number of revolutions the shaft has rotated.

15. The multi-turn encoder module of claim 1, wherein the encoder module is mounted on or attached to one of a flexible circuit, a printed circuit board, and a ceramic substrate.

16. A method of determining a number of revolutions a shaft in a multi-turn encoder has turned, comprising:
providing a rotatable shaft having gears disposed about a periphery thereof;
providing a baseplate having an aperture disposed therethrough and configured to accept at least a portion of the shaft therein, the baseplate further comprising a plurality of geared circular disks, at least some of the geared circular disks comprising an electrically conductive portion, the shaft being operably and mechanically connected to at least one of the geared circular disks by the gears thereof;
providing a substrate having a plurality of inductive coils, each of the inductive coils being operably aligned and configured in respect of a corresponding opposing geared circular disk and the electrically conductive portion thereof, the substrate opposing the baseplate;
providing position logic configured to determine a rotational parameter of the shaft on the basis of the relative positions of the geared circular disks respecting one another as they are sensed by the inductive coils;
rotating the shaft and thereby causing the geared circular disks to rotate according to a predetermined gear reduction ratio, and
for each inductive coil, generating an output signal representative of a revolution of the geared circular disk corresponding thereto, operably aligned in respect thereof and opposed thereto, thereby to permit a number of revolutions the shaft has rotated to be determined by the position logic device.

17. The method of claim 16, wherein the gear reduction ratio in respect of rotation of the shaft and rotation of the last geared circular disk caused to be rotated by rotation of the shaft is one of 4,096, 2,048, 1024 and 512.

18. The method of claim 16, wherein the electrically conductive portions of the geared circular disks comprise at least one of metal, metal foil, an electrically conductive polymer, an electrically conductive plastic, a metal alloy, and a combination of metals.

19. The method of claim 16, further comprising integrating each of the plurality of inductive coils into the substrate.

20. The method of claim 16, further comprising forming a separate component for each of the plurality of inductive coils and attaching same to the substrate.

21. The method of claim 16, further comprising providing each of the plurality of inductive coils as at least one emitter coil and at least one receiver coil.

22. The method of claim 21, wherein the at least one receiver coil comprises at least one pair of receiver coils.

23. The multi-turn encoder module of claim 22, wherein the receiver coils are arranged 90 degrees out of phase with respect to one another.

24. The method of claim 16, further comprising providing a variable gain preamplifier configured to receive and amplify the output signals.

25. The method of claim 16, further comprising providing a digital filtering circuit configured to remove a carrier frequency of the output signals.

26. The method of claim 16, further comprising providing an analog-to-digital converter configured to convert the output signals from an analog form to a digital representation thereof.

27. The method of claim 16, further comprising providing a digital signal processor configured to provide a digital output signal representative of a shaft position.

28. The method of claim 16, further comprising providing a digital signal processor configured to provide a digital output signal representative of the number of revolutions the shaft has rotated.

* * * * *